(12) United States Patent
Noda et al.

(10) Patent No.: US 10,914,572 B2
(45) Date of Patent: Feb. 9, 2021

(54) DISPLACEMENT MEASURING APPARATUS AND DISPLACEMENT MEASURING METHOD

(71) Applicant: Panasonic Intellectual Property Management Co., Ltd., Osaka (JP)

(72) Inventors: Akihiro Noda, Osaka (JP); Hiroya Kusaka, Hyogo (JP); Taro Imagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 16/405,602

(22) Filed: May 7, 2019

(65) Prior Publication Data

US 2019/0265020 A1  Aug. 29, 2019

Related U.S. Application Data

(63) Continuation of application No. PCT/JP2017/034422, filed on Sep. 25, 2017.

(30) Foreign Application Priority Data

Feb. 28, 2017 (JP) .................. 2017-036231

(51) Int. Cl.
*G01B 11/16* (2006.01)
*G06T 7/62* (2017.01)
*G06T 7/73* (2017.01)

(52) U.S. Cl.
CPC ............. *G01B 11/16* (2013.01); *G06T 7/62* (2017.01); *G06T 7/74* (2017.01); *G06T 2207/10028* (2013.01); *G06T 2207/30248* (2013.01)

(58) Field of Classification Search
None
See application file for complete search history.

(56) References Cited

U.S. PATENT DOCUMENTS

2015/0220793 A1\* 8/2015 Kiyohara ........... G06K 9/00791
382/103
2016/0295185 A1\* 10/2016 Mima .................. H04N 9/3179
2019/0026921 A1 1/2019 Murayama et al.

FOREIGN PATENT DOCUMENTS

JP 8-278109 10/1996
JP 11-044533 2/1999
(Continued)

OTHER PUBLICATIONS

International Search Report of PCT application No. PCT/JP2017/034422 dated Dec. 19, 2017.

*Primary Examiner* — Fayyaz Alam
(74) *Attorney, Agent, or Firm* — McDermott Will and Emery LLP

(57) ABSTRACT

A displacement measuring apparatus measures a displacement of a measurement object by using a captured image where the measurement object and a load object are imaged. The displacement is caused by the load object in contact with the measurement object at a contact position. The displacement measuring apparatus includes a position detector, an area setting unit and a displacement calculator. The position detector detects a position, of the load object, in the captured image. The area setting unit sets a position and a size of a detection area in the captured image by using distance information and the position of the load object detected by the position detector, the distance information spatially indicating a distance between the measurement object when the load object is not on the measurement object and an imaging device that generates the captured image. The displacement calculator calculates the displacement by (Continued)

using only an image in the detection area in the captured image.

11 Claims, 13 Drawing Sheets

(56) References Cited

FOREIGN PATENT DOCUMENTS

| | | |
|---|---|---|
| JP | 2004-046464 | 2/2004 |
| JP | 2006-162548 | 6/2006 |
| JP | 2011-064462 | 3/2011 |
| JP | 2011-257389 | 12/2011 |
| JP | 2013-007624 | 1/2013 |
| WO | 2012/008484 | 1/2012 |
| WO | 2017/043258 | 3/2017 |

* cited by examiner

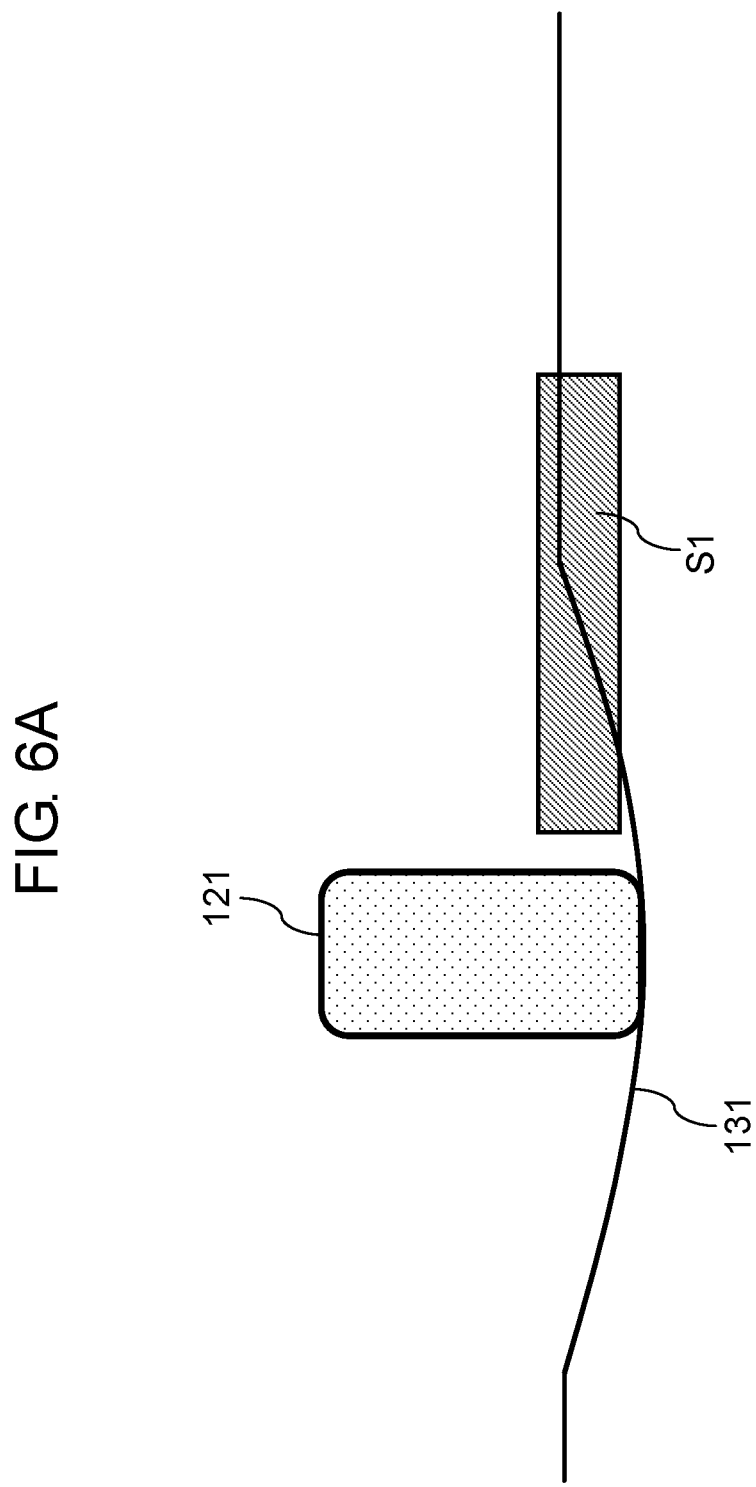

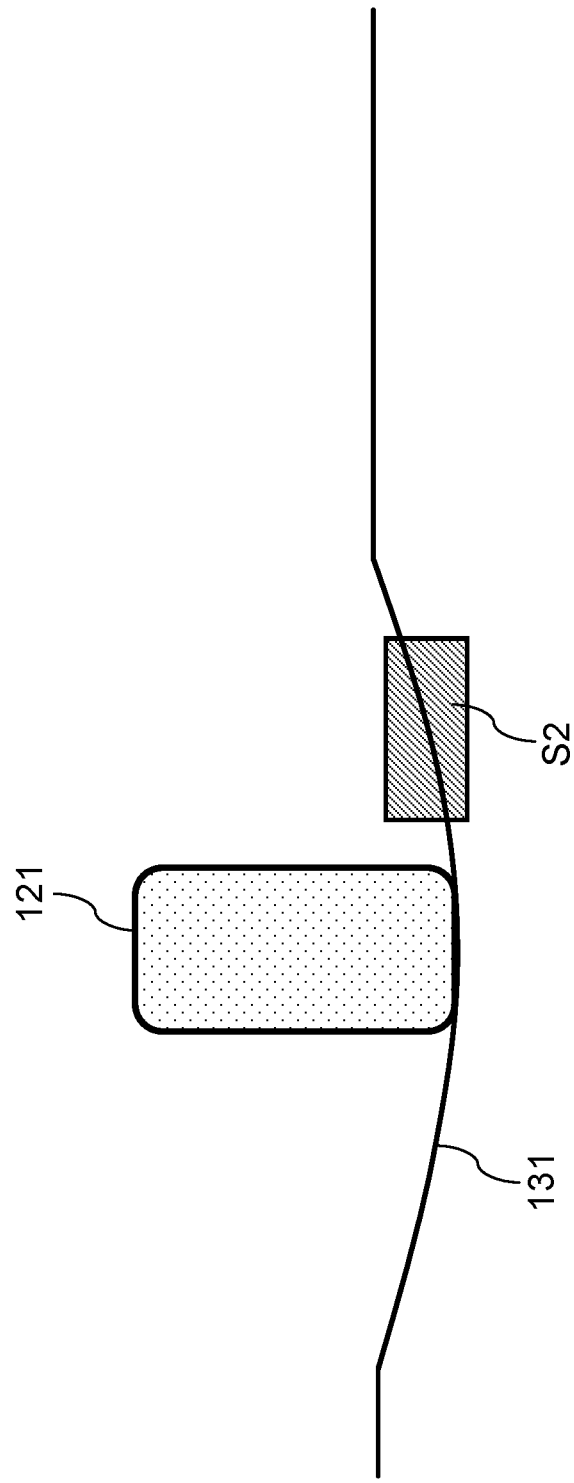

DISPLACEMENT MEASURING APPARATUS AND DISPLACEMENT MEASURING METHOD

TECHNICAL FIELD

The present disclosure relates to a displacement measuring apparatus and a displacement measuring method for measuring a displacement of a measurement object.

BACKGROUND ART

PTL 1 discloses an axle-load measuring apparatus. This axle-load measuring apparatus previously stores a vehicle number, a known axle load, and a known gross weight of a vehicle to be examined as known data, and in addition, previously stores an acceptable range of an error of an axle load and an acceptable range of an error of a gross weight as data for determination to be used to determine measurement accuracy. The axle-load measuring apparatus uses an imaging camera to take an image of a vehicle registration plate of a running vehicle and reads a vehicle number to identify the vehicle to be examined; and, with respect to the identified vehicle to be examined, the axle-load measuring apparatus calculates, based on a load sensor, an error between a measured axle load and the known axle load and an error between a measured gross weight and the known gross weight. Then, the axle-load measuring apparatus determines measurement accuracy, depending on whether the errors are within the acceptable ranges.

CITATION LIST

Patent Literature

PTL 1: Unexamined Japanese Patent Publication No. 2013-7624

SUMMARY

The present disclosure provides a displacement measuring apparatus and a displacement measuring method that highly accurately measure a displacement of a measurement object caused by a load object, from a captured image where the measurement object is imaged.

A displacement measuring apparatus according to one aspect of the present disclosure measures a displacement of a measurement object by using a captured image where the measurement object and a load object are imaged. The displacement is caused by the load object in contact with the measurement object at a contact position. The displacement measuring apparatus includes a position detector, an area setting unit and a displacement calculator. The position detector detects a position, of the load object, in the captured image. The area setting unit sets a position and a size of a detection area in the captured image by using distance information and the position of the load object detected by the position detector, the distance information spatially indicating a distance between the measurement object when the load object is not on the measurement object and an imaging device that generates the captured image. The displacement calculator calculates the displacement by using only an image in the detection area in the captured image.

A displacement measuring method according to one aspect of the present disclosure measures a displacement of a measurement object by using a captured image where the measurement object and a load object are imaged. The displacement is caused by the load object in contact with the measurement object at a contact position. The displacement measuring method includes a position detecting step, an area setting step and a displacement calculation step. The position detecting step is a step of detecting a position of the load object in the captured image. The area setting step is a step of setting a size of a detection area in the captured image by using distance information and the position of the load object detected in the detecting, the distance information spatially indicating a distance between the measurement object when the load object is not on the measurement object and an imaging device that generates the captured image. The displacement calculation step is a step of calculating the displacement by using only an image in the detection area in the captured image.

With the displacement measuring apparatus and the displacement measuring method according to the above present disclosure, it is possible to highly accurately measure the displacement of the measurement object caused by the load object from the captured image where the measurement object is imaged.

BRIEF DESCRIPTION OF DRAWINGS

FIG. 6A is a schematic diagram showing an example of a set area.

FIG. 6B is a schematic diagram showing another example of a set area.

DESCRIPTION OF EMBODIMENTS

Figure 1:
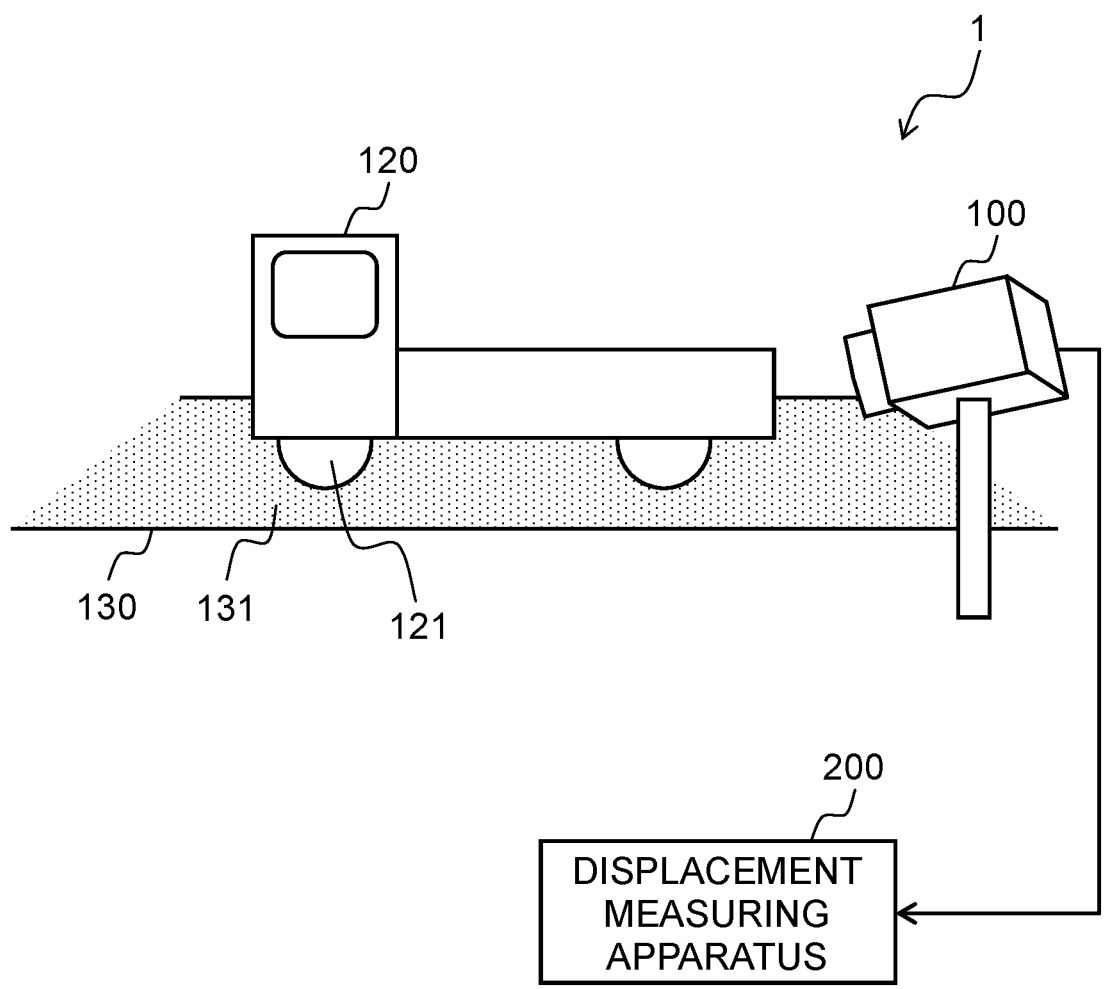
FIG. 1 is an outer appearance view schematically showing an example of how a displacement is measured.

A displacement measuring apparatus according to one aspect of an exemplary embodiment measures a displacement of a measurement object by using a captured image where the measurement object and the load object are imaged. The displacement is caused by the load object in contact with the measurement object at a contact position. The displacement measuring apparatus includes an area setting unit and a displacement calculator. The area setting unit sets a size of a detection area in the captured image by using distance information indicating a distance between an imaging device that generates the captured image and the contact position. The displacement calculator calculates the displacement by using only an image in the detection area in the captured image.

(A Knowledge that the Disclosure is Based on)

To detect movement of a measurement object, it is possible to estimate a displacement of the measurement object by a template matching method, a moire method, and the like by using a plurality of captured images. In this estimation, a larger number of pixels of an image as a template provide higher accuracy of estimation of the displacement.

On the other hand, in the case of detecting an unevenly distributed displacement such as a warp, if an area for detecting a displacement is set too large in a captured image, a large part of the area includes a region where there is no displacement occurring. For this reason, when matching is performed, the matching is done to match more to the part where there is no displacement. For this reason, a displacement can be detected to be smaller.

Further, depending on a spatial positional relationship between the measurement object and the imaging device, the actual length for one pixel is different for individual pixels in the captured image.

To address this issue, an optimum displacement measuring apparatus and a method for measuring the same was considered with the above trade-off taken into account.

Hereinafter, a specific example of a displacement measuring apparatus according to one aspect of the present disclosure will be described. Note that each of the exemplary embodiments to be described below illustrates one preferred specific example of the present disclosure. Numerical values, shapes, materials, components, arrangement positions and connection configurations of the components, steps, processing order of the steps, and the like shown in the following exemplary embodiments are just examples, and are not intended to limit the present disclosure. The present disclosure is limited only by the scope of the claims Therefore, among the components in the following exemplary embodiments, components not described in any of independent claims indicating the most generic concept of the present disclosure are not essential for achieving the object of the present disclosure but are described as components constituting a more preferable configuration.

First Exemplary Embodiment

In this exemplary embodiment, as one aspect of the present disclosure, a description will be given on a displacement measuring system that is installed on a road for general vehicles and that measures a displacement of the road caused by a load of a passing vehicle.

[1-1. Configuration]

[1-1-1. Displacement Detection Device]

FIG. 1 is an outer appearance view schematically illustrating one example of how to measure a displacement according to the first exemplary embodiment of the present disclosure.

As shown in FIG. 1, displacement measuring system 1 is configured with imaging device 100 and displacement measuring apparatus 200. In this exemplary embodiment, road surface 131 of road 130 is a measurement object, and vehicle 120 is a load object. Road surface 131 displaces when receiving load from tire 121 of vehicle 120.

In this exemplary embodiment, for example, displacement measuring apparatus 200 is connected to imaging device 100 that images road 130 on which vehicle 120 is running. With this arrangement, a plurality of captured images generated by imaging device 100 are input into displacement measuring apparatus 200. The captured images are input through communication by radio or wire or through a recording medium. Displacement measuring apparatus 200 measures the displacement of road surface 131 as the measurement object by using the input captured images.

Figure 2:
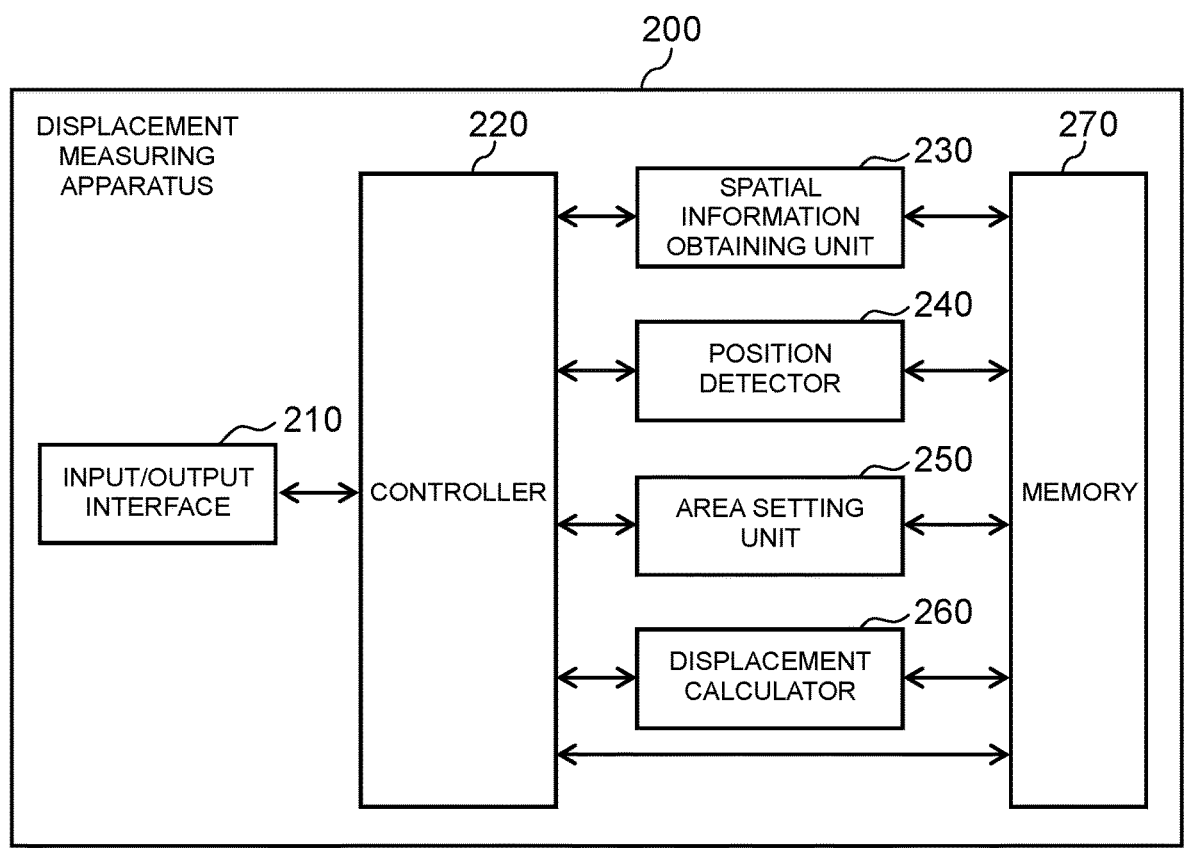
FIG. 2 is a block diagram showing a configuration of a displacement measuring apparatus according to a first exemplary embodiment.

FIG. 2 is a block diagram illustrating a configuration of displacement measuring apparatus 200 according to the first exemplary embodiment of the present disclosure.

As shown in FIG. 2, displacement measuring apparatus 200 includes input/output interface 210, controller 220, spatial information obtaining unit 230, position detector 240, area setting unit 250, displacement calculator 260, and memory 270.

Displacement measuring apparatus 200 is realized by, for example, a microprocessor such as a CPU (Central Processing Unit) executing a program stored in memory 270.

Input/output interface 210 receives input of captured images generated by imaging device 100. For example, input/output interface 210 receives a 4096×2160 pixel digital image. Input/output interface 210 outputs the received captured images to controller 220.

Controller 220 controls an operation of each part. Controller 220 has, for example, a non-volatile memory storing a program, a volatile memory serving as a temporary storage area for executing a program, an input/output port, a processor that executes a program, and other components.

Spatial information obtaining unit 230 obtains spatial information of road surface 131 by using a captured image in which vehicle 120 is not imaged.

Figure 3:
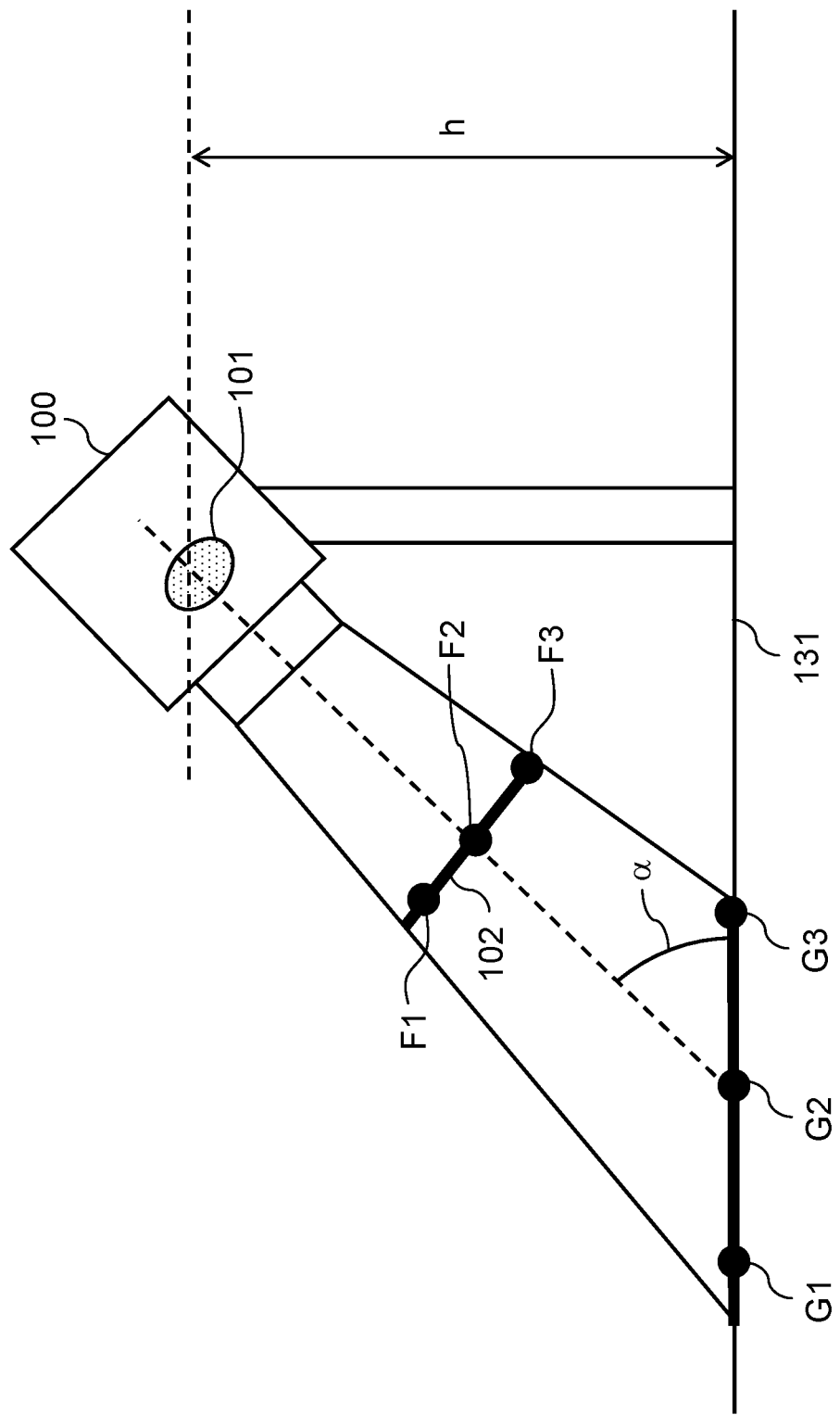
FIG. 3 is a diagram illustrating spatial information.

FIG. 3 is a diagram illustrating spatial information. As shown in FIG. 3, spatial information obtaining unit 230 uses installation information that is stored in memory 270 and indicates a height h of imaging element 101 of imaging device 100 with respect to road surface 131, an angle of view, an angle α of imaging element 101 with respect to road surface 131, and other information. That is, the angle α is a shooting angle of imaging device 100 with respect to road surface 131. Spatial information obtaining unit 230 calculates spatial information by calculating which point on the captured image each point on road surface 131 is projected onto. Here, spatial information obtaining unit 230 may calculate spatial information by calculating which point on imaginary projection plane 102 each point on road surface 131 is projected onto.

The spatial information is the information indicating a positional relationship between imaging device 100 and road surface 131 projected onto the captured image. That is, the spatial information includes distance information indicating a distance between imaging device 100 and a contact position between road surface 131 and vehicle 102. Alternatively, the distance information may be determined based on the above installation information. Specifically, the distance information may be determined based on the height of imaging device 100 with respect to road surface 131 and the shooting angle of imaging device 100 with respect to road surface 131. In more detail, the distance information may be determined based on a geometry between imaging device 100 and road surface 131, where the geometry is determined based on the height of imaging device 100 with respect to road surface 131 and on the shooting angle of imaging device 100 with respect to road surface 131. The spatial information is used to correct an issue that the actual length for one pixel at individual points on the captured image is different among the points. Spatial information obtaining unit 230 calculates the spatial information by using a perspective projection method or other methods.

With respect to FIG. 3, points G1, G2, and G3 on road surface 131 respectively correspond to points F1, F2, and F3 on projection plane 102. The same-length pixel is displayed at each of point F3 and point F1 on the captured image, where point F3 is a projection of point G3 on road surface 131 close to imaging device 100, and point F1 is a projection of point G1 on road surface 131 distant from imaging device 100. However, the actual lengths are different. Further, the actual length for one pixel at point F2, which is a projection of point G2 at a midpoint between point G1 and point G3 on road surface 131, is also different from the actual length for one pixel of each of point F1 and point F3. This is because each of points G1, G2, and G3 is projected to be smaller on the captured image as the distance between imaging device 100 and each of points G1, G2, and G3 is larger.

Position detector 240 takes out, in a photographing time order, a plurality of captured images stored in memory 270 and detects a position of the tire in each captured image. As a method of detecting the tire position on the captured image, position detector 240 can use a commonly used technique such as an image recognition technology, a template matching method, a machine learning method, and a neural network. Accuracy of displacement detection may be in pixel units or may be in sub-pixel units.

Area setting unit 250 sets a detection area to be used to detect a displacement of road surface 131 on the captured image. Specifically, area setting unit 250 sets a position and size of the detection area. How to set the detection area will be described later.

Displacement calculator 260 takes out, in a photographing time order, a plurality of captured images stored in memory 270 and calculates the displacement of road surface 131 by using the image in the detection area set by area setting unit 250. As a method for detecting a displacement in the captured image, displacement calculator 260 can use a template matching method. Alternatively, displacement calculator 260 may use as the displacement detection method a commonly used displacement detection method such as block matching, a correlation method, a sampling moire method, and a feature point tracking method. Here, examples of the correlation method include a normalized cross correlation method, a phase correlation method, and a laser speckle correlation method. Accuracy of displacement detection may be in pixel units or may be in sub-pixel units.

Memory 270 is an example of a storage storing the captured images input from input/output interface 210. Memory 270 stores the installation information of imaging device 100. Memory 270 is also used as a working memory for each unit. For example, memory 270 stores the spatial information obtained by spatial information obtaining unit 230. Memory 270 stores the positional information of tire 121 detected by position detector 240. Memory 270 stores the area information set by area setting unit 250. Memory 270 stores the road surface displacement calculated by displacement calculator 260. Memory 270 is configured, for example, with a semiconductor storage element such as a DRAM (Dynamic Random Access Memory) operable at a high speed.

[1-2. Operation]

[1-2-1. Overall operation]

Figure 4:
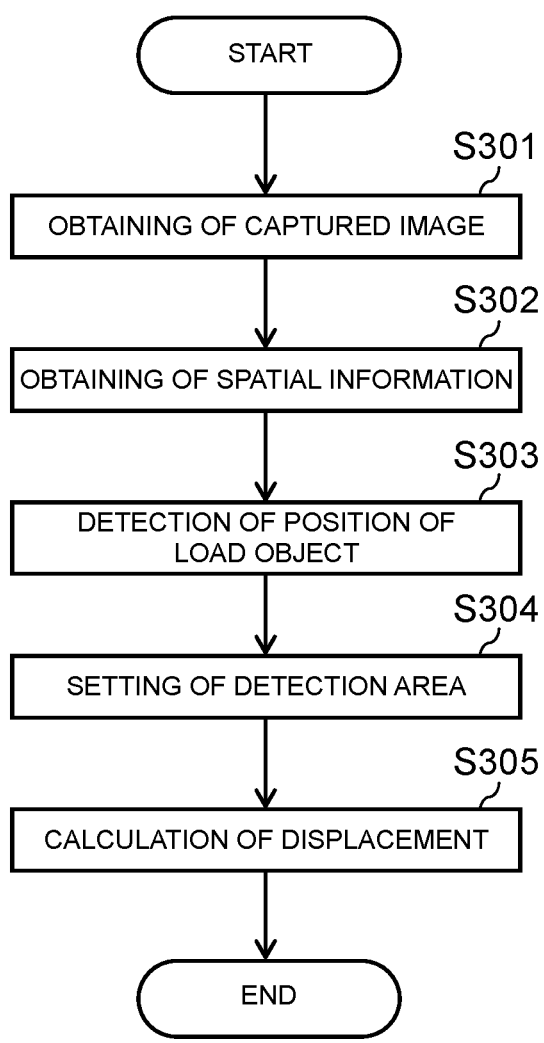
FIG. 4 is a flowchart showing an operation of the displacement measuring apparatus.

FIG. 4 is a flowchart showing an operation of displacement measuring apparatus 200 according to the first exemplary embodiment.

Controller 220 obtains a captured image from imaging device 100. Controller 220 obtains the captured image generated by imaging device 100 via input/output interface 210. Then controller 220 stores the captured image in memory 270 (step S301).

Controller 220 causes spatial information obtaining unit 230 to obtain the spatial information (step S302). Spatial information obtaining unit 230 obtains the spatial information by using the captured image stored in memory 270 and the installation information stored in imaging device 100.

Controller 220 causes position detector 240 to detect the position of tire 121, on road surface 131, in the captured image (step S303).

Controller 220 causes area setting unit 250 to set the detection area for detecting the displacement of road surface 131, in the captured image (step S304).

Controller 220 causes displacement calculator 260 to calculate the displacement of road surface 131 by using the captured image in the detection area set by area setting unit 250 (step S305). Displacement calculator 260 takes out, in a photographing time order, the captured images stored in memory 270 and calculates, in pixel units, the displacement of road surface 131 by using the image in the detection area set by area setting unit 250. Displacement calculator 260 converts the displacement (in pixel units) on the image into the displacement (in meters) in the real space by using the spatial information obtained by spatial information obtaining unit 230. That is, displacement calculator 260 calculates the actual displacement of road surface 131 caused by vehicle 120 by using the distance information included in the spatial information and the displacement in the captured image.

[1-2-2. Setting of Detection Area]

Figure 5:
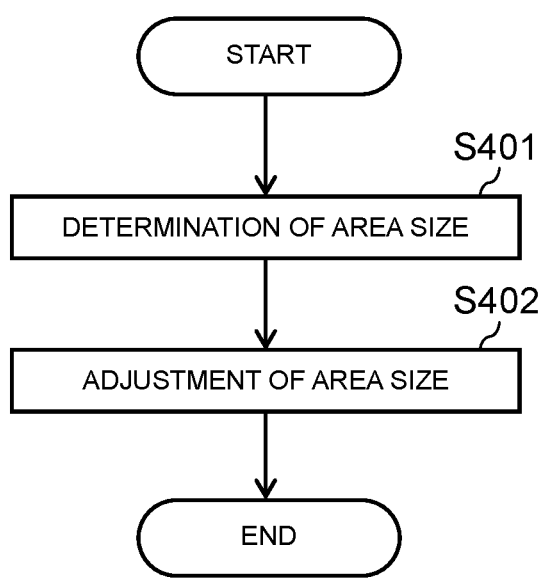
FIG. 5 is a flowchart showing an operation of an area setting unit.

FIG. 5 is a flowchart showing an operation of the area setting unit.

First, area setting unit 250 determines the area size of the detection area by using the spatial information (step S401). Specifically, area setting unit 250 obtains the distance information indicating the distance between imaging device 100 and the contact position between road surface 131 and vehicle 120, from the spatial information. Area setting unit 250 sets the size of the detection area in such a manner that the detection area is larger, as the distance indicated by the distance information is shorter. In addition, area setting unit 250 sets the position of the detection area by using the positional information that is generated by position detector 240 and indicates the position of tire 121 of vehicle 120. Hereinafter, an operation of area setting unit 250 will be described in detail.

Area setting unit 250 may set a plurality of area sizes at a position arbitrarily set based on the tire position detected by position detector 240 and may determine the area size of the detection area, based on results of displacements calculated for the individual area sizes. Further, area setting unit 250 may set a plurality of positions on the basis of the tire position and may determine the area size of the detection area by using an average value or a median of results of displacements in the detection areas set at the individual positions.

FIG. 6A is a schematic diagram showing an example of a set area. FIG. 6B is a schematic diagram showing another example of a set area.

FIGS. 6A and 6B each show that road surface 131, which is in contact with tire 121 of vehicle 120 running on road 130, is displaced due to an axle load of vehicle 120 (see FIG. 1). In addition, FIG. 6A shows that area S1 is set as the detection area by area setting unit 250. Further, FIG. 6B shows that area S2 is set as the detection area by area setting unit 250.

Figure 7:
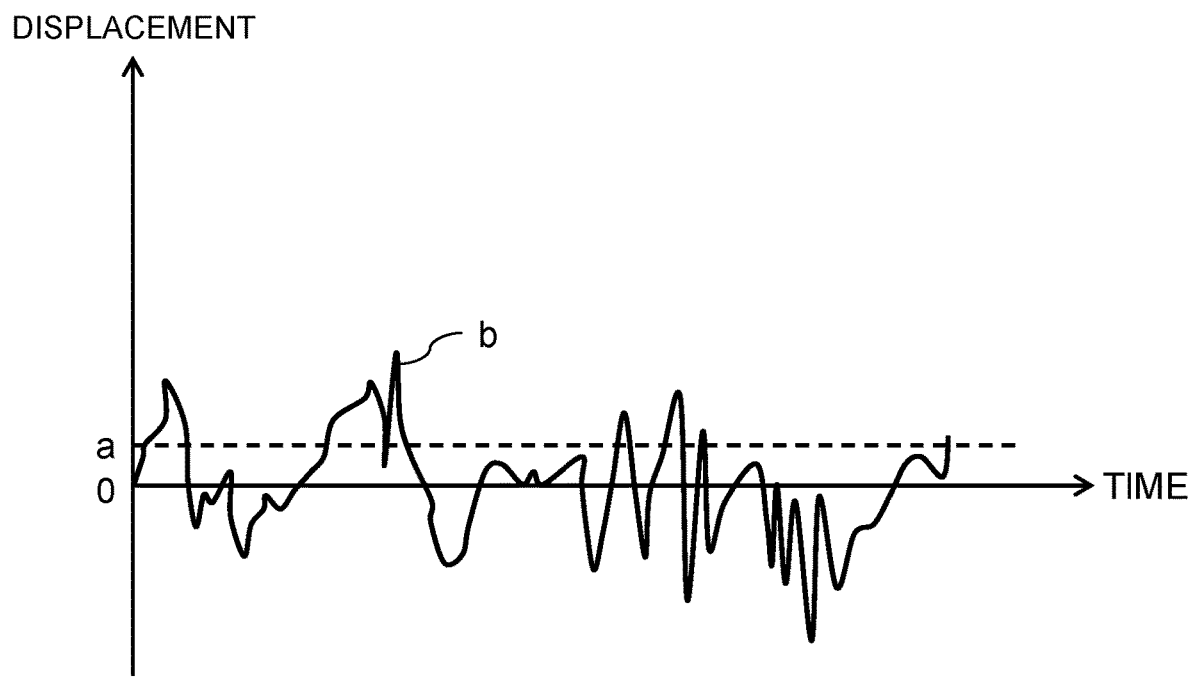
FIG. 7 is a diagram illustrating noise in a captured image.
Figure 8:
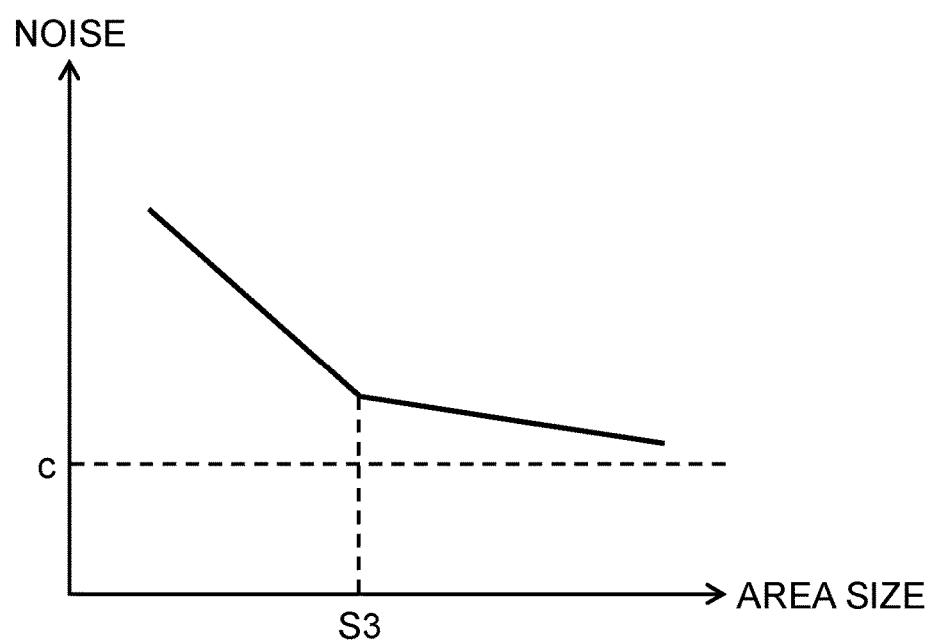
FIG. 8 is a diagram illustrating a relationship between noise and an area size.

FIG. 7 is a diagram illustrating noise in a captured image. FIG. 8 is a diagram illustrating a relationship between noise and an area size. In FIG. 7, the vertical axis represents a displacement, and the horizontal axis represents time. In FIG. 8, the vertical axis represents noise, the horizontal axis represents an area size.

FIG. 7 shows, in order of the image capturing time, displacements detected with respect to a plurality of captured images that do not include vehicle 120. In this case, no displacement is detected among the captured images, so that the result of calculating the displacement is zero at each time. Actually, as shown in FIG. 7, a displacement b is calculated as a noise component due to noises of imaging element 101 (see FIG. 3), atmospheric fluctuation, and the like. Thus, for example, a variance of the displacement b can be considered to be noise. Note that instead of a variance, a standard deviation may be considered as noise.

Such noise is generally white noise. For this reason, in the template matching method, when the area size is made large as area S1 of FIG. 6A, the noise is normalized, the noise therefore affects less as shown in FIG. 8. That is, as the area size is made larger, the noise gets closer to the saturation value c. On the other hand, when a proportion of a region where a displacement is caused to a region of the detection area is made large as area S2 of FIG. 6B, a sensitivity of displacement is improved.

Figure 9:
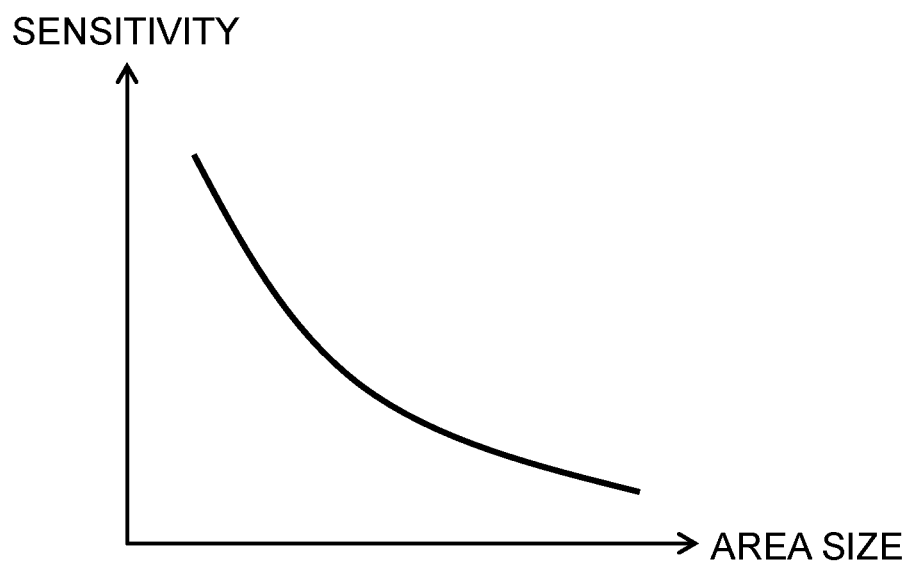
FIG. 9 is a diagram illustrating a relationship between a sensitivity of displacement detection and the area size.

Further, as shown in FIG. 9, the sensitivity of displacement detection becomes lower, as the area size becomes larger. FIG. 9 is a diagram illustrating a relationship between the sensitivity of displacement detection and the area size. With reference to FIG. 9, the vertical axis represents sensitivity, and the horizontal axis represents an area size. When the area size is large, a proportion of the part where there is no displacement caused to the region of the set detection area is large. For this reason, when template matching method is performed, the matching is done to match more to the part where there is no displacement, and the sensitivity of displacement detection therefore becomes low.

Figure 10:
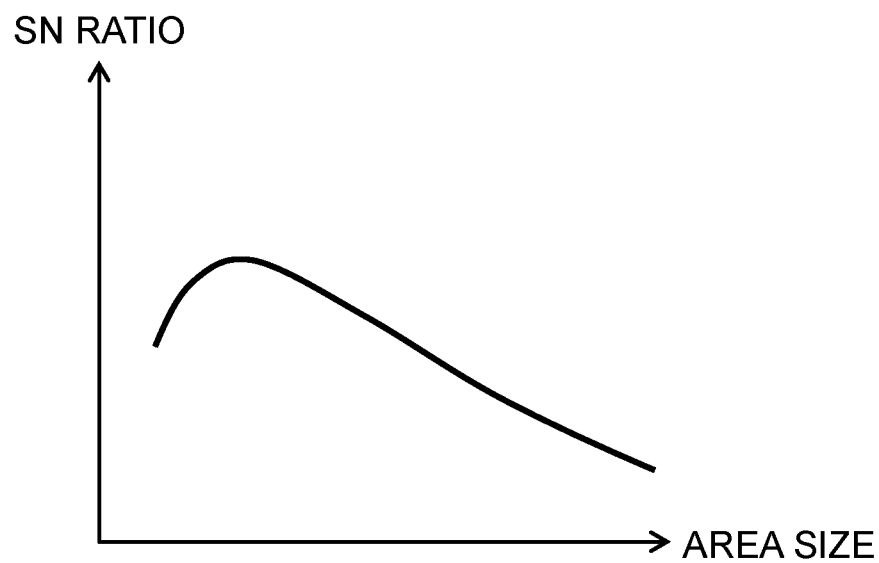
FIG. 10 is a diagram illustrating a relationship between the area size and a signal-to-noise (SN) ratio.

From the above, a relationship between the area size and an SN ratio (Signal-to-Noise ratio) is considered as shown in FIG. 10. FIG. 10 is a diagram illustrating the relationship between the area size and the SN ratio. With respect to FIG. 10, the vertical axis represents the SN ratio, and the horizontal axis represents the area size. As shown in FIG. 10, if the SN ratio has a peak, the area size corresponding to the peak position may be set as the size of the detection area. Alternatively, if the SN ratio has no peak, area size S3 where the noise level starts to increase in FIG. 8 may be set as the size of the detection area.

Area setting unit 250 calculates the area size by any one of the above methods.

Next, area setting unit 250 obtains the actual length of one pixel from the distance information obtained by spatial information obtaining unit 230. Area setting unit 250 adjusts the calculated area size, by using the length (step S402).

Area setting unit 250 adjusts the area size, depending on the actual length of one pixel. Area setting unit 250 sets, for example, a standard of 10 cm in actual length and adjusts the area size for each position of tire 121 by using the spatial information such that the area size (size in pixels) is equal to the size of the standard. This is because if the area size based on the same standard is not used, the displacement when the same weight is loaded does not have the same value. That is, the area size is converted into the size in pixels corresponding to the actual length.

Figure 11A:
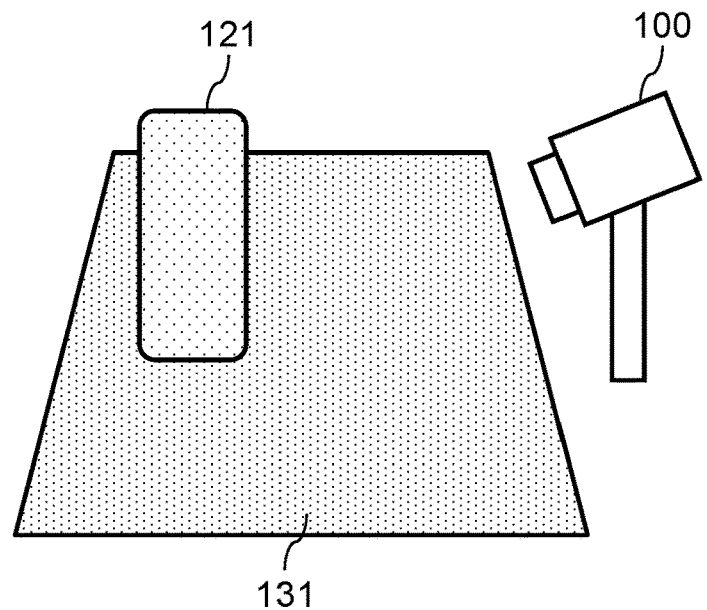
FIG. 11A is a diagram illustrating a positional relationship between an imaging device and a tire.
Figure 11B:
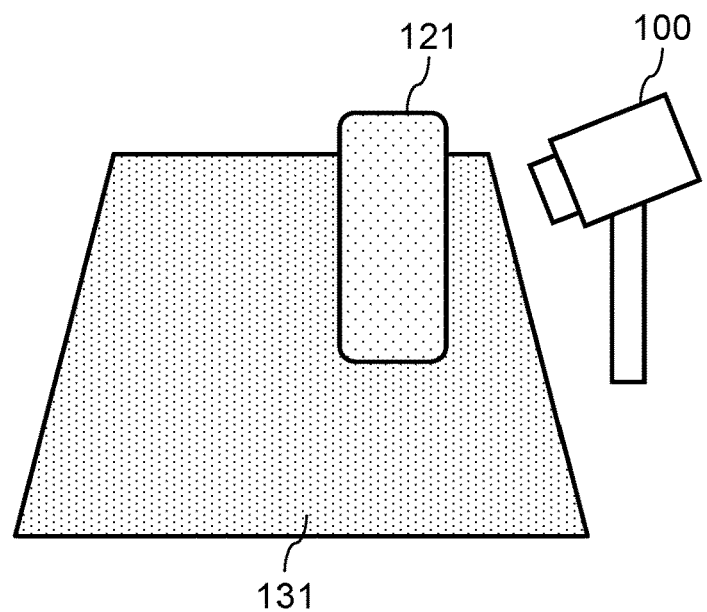
FIG. 11B is a diagram illustrating a positional relationship between an imaging device and a tire.
Figure 12A:
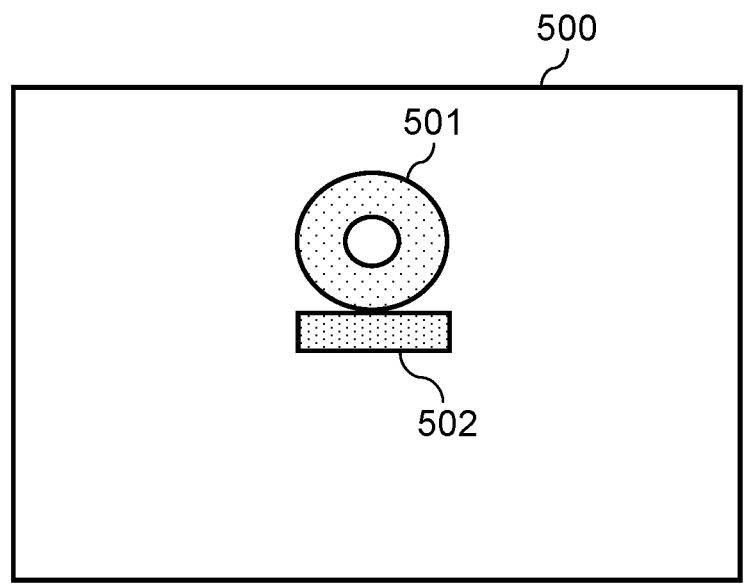
FIG. 12A is a diagram showing a captured image where a tire is imaged in the state of FIG. 11A.
Figure 12B:
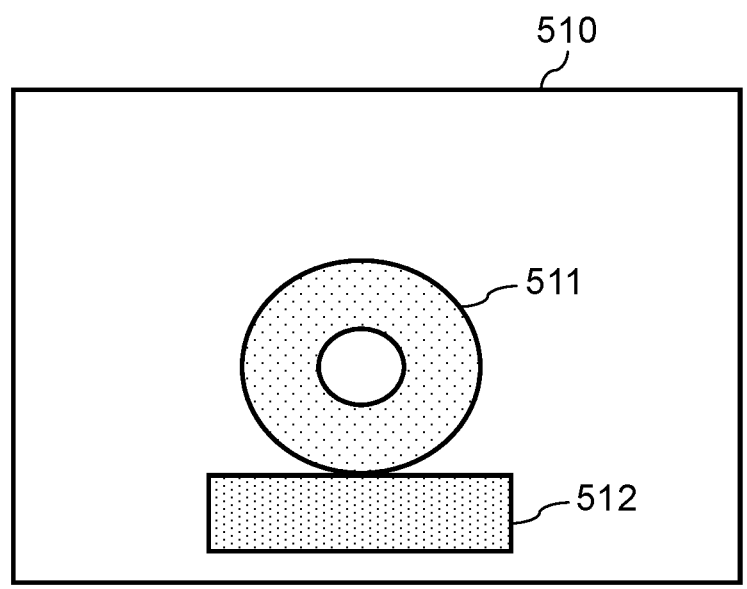
FIG. 12B is a diagram showing a captured image where a tire is imaged in the state of FIG. 11B

FIGS. 11A and 11B are diagrams each illustrating a positional relationship between imaging device 100 and tire 121. FIG. 12A is a diagram showing a captured image where tire 121 is imaged by imaging device 100 in the state of FIG. 11A. FIG. 12B is a diagram showing a captured image where tire 121 is imaged by imaging device 100 in the state of FIG. 11B.

FIG. 11A shows that tire 121 is at a position distant from imaging device 100. FIG. 11B shows that tire 121 is at a position close to imaging device 100. Further, FIG. 12A shows captured image 500 generated by imaging device 100 in the state of FIG. 11A. FIG. 12B shows captured image 510 generated by imaging device 100 in the state of FIG. 11B. As shown in FIGS. 12A and 12B, depending on the distance between imaging device 100 and tire 121 at the time of imaging, tire 501 in captured image 500 is imaged smaller than tire 511 in captured image 510.

In this case, the position of tire 501 in FIG. 12A corresponds to the position of point F1 in FIG. 3. In addition, the position of tire 511 in FIG. 12B corresponds to the position of point F3 in FIG. 3. In this situation, assume that the actual length of one pixel calculated by spatial information obtaining unit 230 is 3/5 cm at point F1 and for pixels in the vicinity of point F1 and is 3/20 cm at point F3 and for pixels in the vicinity of point F3. In this case, if the area size (height x width) is 3 cm×60 cm, the area size of detection area 502 in captured image 500 is 5 pixels×100 pixels, and the area size of detection area 512 in captured image 510 is 20 pixels×400 pixels. In FIG. 12A, the size of detection area 502 is 5 pixels×100 pixels, and in FIG. 12B, the size of detection area 512 is 20 pixels×400 pixels. Even if the sizes of detection areas 502, 512 are different on the captured image, the size of the region of the object whose displacement is to be detected can be the same for detection areas 502, 512 by adjusting the area size as described above.

With respect to captured image 500, displacement calculator 260 calculates the displacement by using only the image in detection area 502 in captured image 500. In addition, with respect to captured image 510, displacement calculator 260 calculates the displacement by using only the image in detection area 512 in captured image 510.

[1-3. Advantageous Effect]

Displacement measuring apparatus 200 of the first exemplary embodiment is a displacement measuring apparatus that measures a displacement of road surface 131 by using a captured image in which road surface 131 of road 130 and tire 121 of vehicle 120 are imaged. The displacement is caused by the tire 121 of vehicle 120 in contact with the road surface 131 of road 130 at a contact position. The displacement measuring apparatus 200 includes area setting unit 250, and displacement calculator 260. Area setting unit 250 sets a size of a detection area in the captured image by using distance information indicating a distance between imaging device 100 that generates the captured image and the contact position. Displacement calculator 260 calculates the displacement of road surface 131 by using only an image in the detection area in the captured image.

By setting the detection area by using spatial information, it is possible to perform displacement measurement robust to a change in the placement of imaging device 100, a change in the position of the detection area in the captured image, and the like. Therefore, the accuracy of displacement measurement can be improved.

Further, an actual displacement can be measured from a pixel displacement in the captured image by geometric transformation using spatial information.

Second Exemplary Embodiment

[2-1. Configuration]

Figure 13:
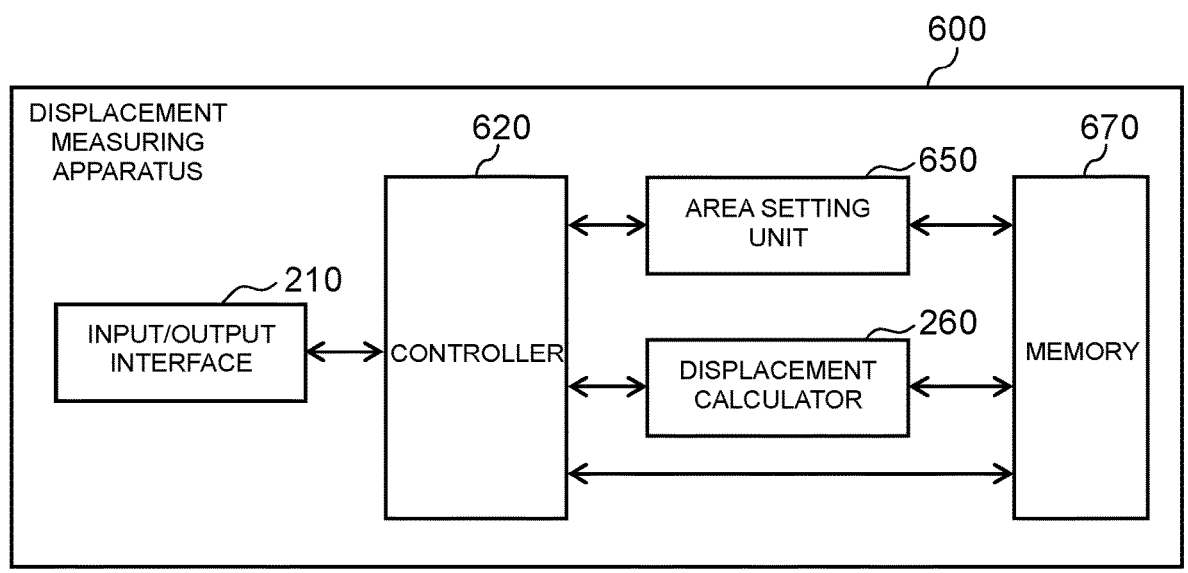
FIG. 13 is a block diagram showing a configuration of a displacement measuring apparatus according to a second exemplary embodiment.

FIG. 13 is a block diagram illustrating a configuration of displacement measuring apparatus 600 according to a second exemplary embodiment of the present disclosure. In FIG. 13, components that perform operations similar to those in the first exemplary embodiment are given the same reference marks, and description thereof is omitted.

As shown in FIG. 13, displacement measuring apparatus 600 includes input/output interface 210, controller 620, area setting unit 650, displacement calculator 260, and memory 670.

Displacement measuring apparatus 600 is realized, for example, by a microprocessor executing a program stored in memory 670.

Controller 620 controls operation of each unit. Controller 620 has, for example, a non-volatile memory storing a program, a volatile memory serving as a temporary storage area for executing a program, an input/output port, a processor that executes a program, and other components.

Area setting unit 650 sets a detection area to be used to detect a displacement of road surface 131 on a captured image. How to set the detection area will be described later.

Different from displacement measuring apparatus 200 of the first exemplary embodiment, displacement measuring apparatus 600 of the second exemplary embodiment does not include spatial information obtaining unit 230. In the second exemplary embodiment, controller 620 obtains spatial information from imaging device 100 itself or other devices via input/output interface 210. Then, controller 620 stores the spatial information in memory 670. For example, in a case where imaging device 100 is a TOF (Time of Flight) camera, controller 620 obtains the spatial information measured by imaging device 100. Alternatively, controller 620 may obtain spatial information measured by a stereo camera, a multi-view stereo camera, a pattern projection method, a laser range finder, or other devices. Here, if the spatial information is obtained from a stereo camera or a multi-view camera, it is possible to calibrate the spatial information by capturing an image including a calibration board whose size is known, or it is possible for a user to calibrate the spatial information by manual input.

Further, different from displacement measuring apparatus 200 of the first exemplary embodiment, displacement measuring apparatus 600 of the second exemplary embodiment does not include position detector 240. In the second exemplary embodiment, controller 620 obtains the information indicating a tire position from an embedded sensor embedded in road 130, a laser sensor disposed on a load side, or other sensors. Controller 620 stores the obtained information indicating the tire position in memory 670.

Area setting unit 650 sets a detection area to be used to detect a displacement of road surface 131 on a captured image.

[2-2. Operation]

The operation of displacement measuring apparatus 600 of the second exemplary embodiment is the same as the operation of the flowchart of FIG. 4. The difference from the first exemplary embodiment is that in the operations of step S302 and step S303, controller 620 obtains individual pieces of information from an external device via input/output interface 210 and stores the information in memory 670. In addition, because the operation of area setting unit 650 is different from the operation of area setting unit 250, the operation of area setting unit 650 will be described.

Figure 14:
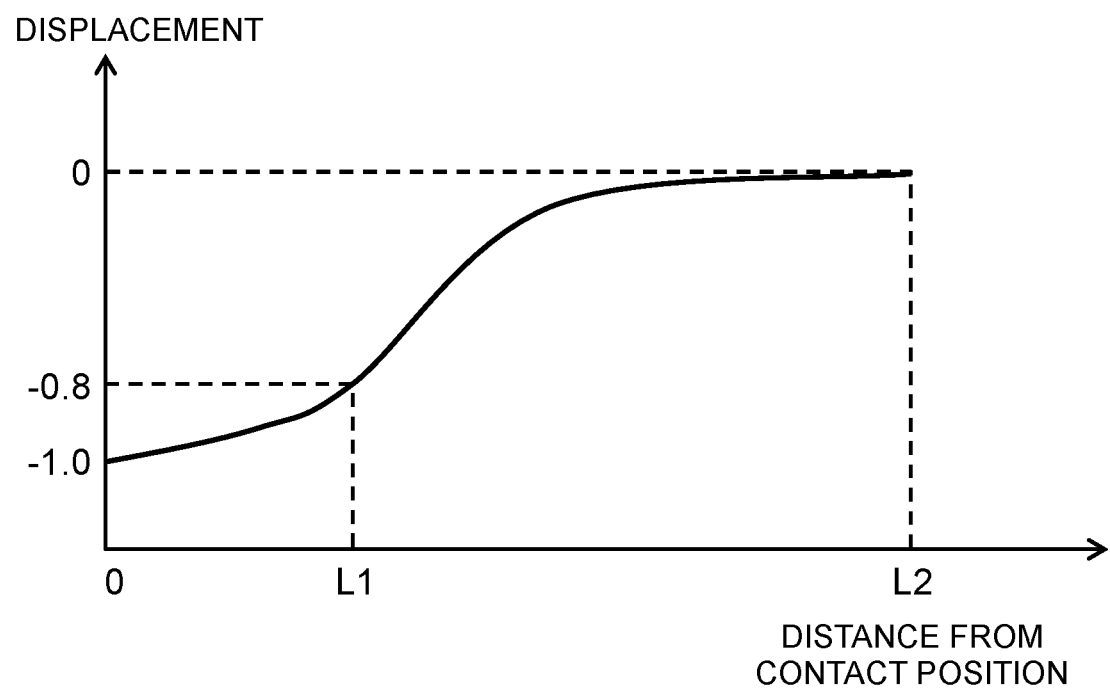
FIG. 14 is a diagram illustrating a relationship between a displacement and a distance from a contact position.

FIG. 14 is a diagram illustrating a way of setting the detection area according to the second exemplary embodiment. In FIG. 14, the vertical axis represents the displacement, and the horizontal axis represents a distance from the contact position (directly under the tire). In FIG. 14, the direction in which road surface 131 sinks is negative, and the displacement at the contact position is normalized to be −1.0. As shown in FIG. 14, the displacement gets closer to 0, as the distance from the contact position becomes larger.

Area setting unit 650 sets the detection area, based on a spatial distribution shape of displacement shown in FIG. 14. Area setting unit 650 sets the detection area to a position at which the displacement of road surface 131 is, for example, 0.8 times the displacement at the contact position. In the case of FIG. 14, the area size is set to be the region from distance 0 (contact position) to distance L1. This is because although the displacement is continuously caused to distance L2, the area size up to distance L1 can secure sufficient displacement detection accuracy.

2-3. ADVANTAGEOUS EFFECT

In the second exemplary embodiment, area setting unit 650 uses a spatial distribution shape of displacement to set as a detection area a region which is in an area where displacement is caused and in which a displacement larger than or equal to a predetermined magnitude is detected. In this way, it is possible to reduce a process amount of setting of the detection area.

Note that area setting unit 650 may set the detection area only based on noise. For example, as the optimum size of the detection area, it is also possible to set area size S3 at which the noise shown in FIG. 8 starts to increase. This operation can further reduce the process amount.

Further, area setting unit 650 sets the detection area by using a spatial distribution shape of the road surface displacement. However, the present disclosure is not limited to this operation. Area setting unit 650 may set the detection area by using sensitivity of displacement detection.

Other Exemplary Embodiments

As described above, the first and second exemplary embodiments have been described as illustrations of the technique disclosed in the present application. However, the technique in the present disclosure is not limited to the first and second exemplary embodiments, and are applicable to exemplary embodiments in which changes, replacements, additions, omissions, or the like are made as appropriate.

In the present disclosure, a measurement object is imaged by a single imaging device. However, a process similar to that in the present disclosure may be performed on a captured image generated by using a plurality of imaging devices, and a final displacement may be calculated from a plurality of calculation results. Further, a plurality of captured images may be used. This can improve calculation accuracy.

Further, in a case where a tilt of imaging device 100 with respect to road surface 131 changes due to, for example, displacement of road surface 131, the tilt of imaging device 100 may be estimated, for example, from the position of imaging device 100 estimated by a global movement, a movement of a fixed point, a three-dimensional reconstruction, the SFM (Structure from Motion), or the like, and then the installation information stored in a memory may be corrected.

In the present disclosure, the description has been given on an example of measuring the displacement of road surface 131 caused by vehicle 120 running on road 130. However, the present disclosure is not limited to this case and can be applied to the case of measuring the displacement of a measurement object having a surface such as a floor surface when a load object is placed on the measurement object.

In the present disclosure, the displacement measuring apparatus has been described as an example of a configuration realized by a microprocessor executing a program stored in a memory in a computer including the microprocessor and the memory. However, the displacement measuring apparatus is not necessarily limited to a configuration example realized exactly in the same way as the above realized example as long as the displacement measuring apparatus has a function equivalent to the function of the above realized example. For example, the displacement measuring apparatus may be an example of a configuration in which a part of or all of components constituting the displacement measuring apparatus are realized by a dedicated circuit.

Further, the components (function blocks) in the displacement measuring apparatus may each be realized as a single chip or may be realized as a single chip containing a part or all of the components, by using a semiconductor device such as an IC (Integrated Circuit) or an LSI (Large Scale Integration). Further, a method for circuit integration is not limited to the LSI, and may be realized by a dedicated circuit or a general-purpose processor. It is also possible to use an FPGA (Field Programmable Gate Array) that can be programed after being subjected to LSI fabrication or to use a reconfigurable processor in which connections or settings of circuit cells in the LSI can be reconfigured. Further, when there emerges a technique for circuit integration that replaces the LSI as a result of the development of semiconductor technology or another technology derived from a semiconductor technology, the function blocks may be integrated by using that technique. There is a possibility that biotechnology can be applied.

Further, all of or a part of various processes described above may be realized by hardware such as an electronic circuit, or may be realized by using software. Note that processing by software is realized in such a way that a processor included in the displacement measuring apparatus executes a program stored in the memory. Further, the program may be recorded on a recording medium and may be distributed or circulated. For example, the distributed program is installed in another apparatus including a processor, and the program is executed by the processor, so that the apparatus can execute the above processes.

In addition, exemplary embodiments realized by arbitrary combination of the components and the functions of the above-described exemplary embodiments are included in the scope of the present disclosure.

INDUSTRIAL APPLICABILITY

The present disclosure can be used for a displacement measuring apparatus that measures, by using a captured image, a displacement of a measurement object having a surface when a load object is placed on the measurement object.

REFERENCE MARKS IN THE DRAWINGS 1 displacement measuring system
100 imaging device
200, 600 displacement measuring apparatus
210 input/output interface
220, 620 controller
230 spatial information obtaining unit
240 position detector
250, 650 area setting unit
260 displacement calculator
270, 670 memory

The invention claimed is:

1. A displacement measuring apparatus that measures a displacement of a measurement object by using a captured image where the measurement object and a load object are imaged, the displacement being caused by the load object in contact with the measurement object at a contact position, the displacement measuring apparatus comprising:
a position detector that detects a position, of the load object, in the captured image;
an area setting unit that sets a position and a size of a detection area in the captured image by using distance information and the position of the load object detected by the position detector, the distance information spatially indicating a distance between the measurement object when the load object is not on the measurement object and an imaging device that generates the captured image; and
a displacement calculator that calculates the displacement by using only an image in the detection area in the captured image.

2. The displacement measuring apparatus according to claim 1, wherein the area setting unit sets the size of the detection area in such a manner that the detection area is larger, as the distance indicated by the distance information is shorter.

3. The displacement measuring apparatus according to claim 1, wherein
the displacement calculator calculates noise captured when the displacement does not occur, and
the area setting unit sets, as the size of the detection area, an area size when a signal-to-noise ratio of the displacement with respect to an area size in the captured image to the noise is at a peak value or when an inclination of the noise with respect to the area size changes.

4. The displacement measuring apparatus according to claim 1, wherein the displacement calculator calculates the displacement by a template matching method.

5. The displacement measuring apparatus according to claim 1, wherein the displacement calculator calculates a displacement in a real scale of the measurement object caused by the load object in contact with the measurement object, by using the distance information and the displacement obtained from the image in the detection area.

6. The displacement measuring apparatus according to claim 1, comprising a storage that stores the distance information.

7. The displacement measuring apparatus according to claim 1, wherein the distance information is determined based on a height of the imaging device with respect to the measurement object, and a shooting angle of the imaging device with respect to the measurement object.

8. The displacement measuring apparatus according to claim 1, comprising a distance information obtaining unit that calculates the distance information by calculating, by using installation information of the imaging device with respect to the measurement object, each point of the measurement object that is projected onto the captured image.

9. The displacement measuring apparatus according to claim 1, wherein the displacement calculator takes out a plurality of captured images in a photographing time order and calculates the displacement by using an image in the detection area set by the area setting unit.

10. The displacement measuring apparatus according to claim 1, wherein
the measurement object is a road,
the load object is a vehicle, and
the contact position is a position where the road and a tire of the vehicle are in contact with each other.

11. A displacement measuring method for measuring a displacement of a measurement object by using a captured image where the measurement object and a load object are imaged, the displacement being caused by the load object in contact with the measurement object at a contact position, the displacement measuring method comprising:
detecting a position of the load object in the captured image;
setting a position and a size of a detection area in the captured image by using distance information and the position of the load object detected in the detecting, the distance information spatially indicating a distance between the measurement object when the load object is not on the measurement object and an imaging device that generates the captured image; and
calculating the displacement by using only an image in the detection area in the captured image.

* * * * *